(12) United States Patent
Zhu et al.

(10) Patent No.: US 8,963,915 B2
(45) Date of Patent: *Feb. 24, 2015

(54) USING IMAGE CONTENT TO FACILITATE NAVIGATION IN PANORAMIC IMAGE DATA

(75) Inventors: Jiajun Zhu, Charlottesville, VA (US); Daniel Filip, San Jose, CA (US); Luc Vincent, Palo Alto, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/605,635

(22) Filed: Sep. 6, 2012

(65) Prior Publication Data

US 2012/0327184 A1    Dec. 27, 2012

Related U.S. Application Data

(63) Continuation of application No. 12/038,325, filed on Feb. 27, 2008, now Pat. No. 8,525,825.

(51) Int. Cl.
| | | |
|---|---|---|
| *G06T 19/00* | (2011.01) | |
| *G06T 15/00* | (2011.01) | |
| *G06T 15/06* | (2011.01) | |

(52) U.S. Cl.
CPC ............... *G06T 19/00* (2013.01); *G06T 15/06* (2013.01)
USPC .............................. 345/419; 345/427; 348/36

(58) Field of Classification Search
CPC .......... G06T 19/00; G06T 15/00; G06T 15/06
USPC ..................... 345/419, 427; 348/36
See application file for complete search history.

(56) References Cited

U.S. PATENT DOCUMENTS

| | | | |
|---|---|---|---|
| 5,737,533 | A | 4/1998 | de Hond |
| 6,009,190 | A | 12/1999 | Szeliski et al. |
| 6,157,747 | A | 12/2000 | Szeliski et al. |
| 6,256,043 | B1 | 7/2001 | Aho et al. |
| 6,308,144 | B1 | 10/2001 | Bronfeld et al. |
| 7,096,428 | B2 | 8/2006 | Foote et al. |

(Continued)

FOREIGN PATENT DOCUMENTS

| | | |
|---|---|---|
| JP | 2004/342004 A | 12/2004 |
| JP | 2005/250560 A | 9/2005 |

(Continued)

OTHER PUBLICATIONS

Kodobayashi et al. "Combined use of 2D images and 3D ,models for retrieving and browsing digital archive contents", published 2005.*

(Continued)

*Primary Examiner* — Kimbinh T Nguyen
(74) *Attorney, Agent, or Firm* — Lerner, David, Littenberg, Krumholz & Mentlik, LLP

(57) ABSTRACT

The present invention relates to using image content to facilitate navigation in panoramic image data. In an embodiment, a computer-implemented method for navigating in panoramic image data includes: (1) determining an intersection of a ray and a virtual model, wherein the ray extends from a camera viewport of an image and the virtual model comprises a plurality of facade planes; (2) retrieving a panoramic image; (3) orienting the panoramic image to the intersection; and (4) displaying the oriented panoramic image.

20 Claims, 11 Drawing Sheets

(56) References Cited

U.S. PATENT DOCUMENTS

| | | | |
|---|---|---|---|
| 7,161,604 | B2 | 1/2007 | Higgins et al. |
| 7,336,274 | B2 | 2/2008 | Kida |
| 7,353,114 | B1 | 4/2008 | Rohlf et al. |
| 7,570,261 | B1 | 8/2009 | Edecker et al. |
| 7,698,336 | B2 | 4/2010 | Nath |
| 7,712,052 | B2 | 5/2010 | Szeliski et al. |
| 7,882,286 | B1 | 2/2011 | Natanzon et al. |
| 7,933,897 | B2 | 4/2011 | Jones et al. |
| 7,990,394 | B2 * | 8/2011 | Vincent et al. ............... 345/629 |
| 8,072,448 | B2 * | 12/2011 | Zhu et al. ..................... 345/419 |
| 8,319,952 | B2 | 11/2012 | Otani et al. |
| 8,447,136 | B2 | 5/2013 | Ofek et al. |
| 2002/0070981 | A1 | 6/2002 | Kida |
| 2004/0196282 | A1 | 10/2004 | Oh |
| 2004/0257384 | A1 * | 12/2004 | Park et al. .................... 345/646 |
| 2005/0073585 | A1 | 4/2005 | Ettinger et al. |
| 2005/0128212 | A1 | 6/2005 | Edecker et al. |
| 2006/0004512 | A1 | 1/2006 | Herbst et al. |
| 2006/0050091 | A1 | 3/2006 | Shoemaker et al. |
| 2006/0132482 | A1 | 6/2006 | Oh |
| 2006/0271280 | A1 | 11/2006 | O'Clair |
| 2007/0030396 | A1 * | 2/2007 | Zhou et al. .................... 348/700 |
| 2007/0070069 | A1 * | 3/2007 | Samarasekera et al. ...... 345/427 |
| 2007/0076920 | A1 | 4/2007 | Ofek |
| 2007/0143345 | A1 | 6/2007 | Jones et al. |
| 2007/0208719 | A1 | 9/2007 | Tran |
| 2007/0210937 | A1 | 9/2007 | Smith et al. |
| 2007/0250477 | A1 | 10/2007 | Bailly |
| 2007/0273558 | A1 | 11/2007 | Smith et al. |
| 2007/0273758 | A1 | 11/2007 | Mendoza et al. |
| 2008/0002916 | A1 | 1/2008 | Vincent et al. |
| 2008/0033641 | A1 | 2/2008 | Medalia |
| 2008/0143709 | A1 | 6/2008 | Fassero et al. |
| 2008/0268876 | A1 | 10/2008 | Gelfand et al. |
| 2009/0132646 | A1 | 5/2009 | Yang et al. |
| 2009/0279794 | A1 | 11/2009 | Brucher et al. |
| 2009/0315995 | A1 | 12/2009 | Khosravy et al. |
| 2010/0076976 | A1 | 3/2010 | Sotirov et al. |
| 2010/0250120 | A1 | 9/2010 | Waupotitsch et al. |
| 2010/0257163 | A1 | 10/2010 | Ohazama et al. |
| 2010/0305855 | A1 | 12/2010 | Dutton et al. |
| 2011/0137561 | A1 | 6/2011 | Kankainen |
| 2011/0270517 | A1 | 11/2011 | Benedetti |
| 2011/0283223 | A1 | 11/2011 | Vaittinen et al. |

FOREIGN PATENT DOCUMENTS

| | | | |
|---|---|---|---|
| JP | 2008/520052 | A | 6/2008 |
| WO | 2007 044975 | A2 | 4/2007 |

OTHER PUBLICATIONS

Cornells et al. "3D Urban Scene Modeling Integrating Recognition and Reconstruction", Published Oct. 2007.*

The State Intellectual Property Office of the People's Republic of China, "Notification of the Second Office Action," Appln. No. 200980114885.5, Date of Issuing: Sep. 12, 2012, pp. 1/52-10/52 (English language provided—pp. 1-15).

Yang, Yang, "Research on the Virtual Reality Technology of Digital Tour System," Chinese Master's Theses Full-Text Database Information Science and Technology, Issue 5, Nov. 15, 2007, pp. 12/52-39/52.

Cobzas et al., "A Panoramic Model for Remote Robot Environment Mapping and Predictive Display," Published 2005.

Kulju et al., "Route Guidance Using a 3D City Mobile Device," Published 2002.

Kimber, et al.; "FlyAbout: Spatially Indexed Panoramic Video," *Proceedings of the ninth ACM international conference on Multimedia*; 2001; pp. 339-347.

Lowe, et al.; "Fitting Parameterized Three-Dimensional Models to Images," *IEEE Transactions on Pattern Analysis and Machine Intelligence*, 13, May 5, 1991; pp. 441-450.

Bay et al., "SURF: Speeded Up Robust Features;" *Computer Vision—European Conference on Computer Vision 2006*; Jul. 26, 2006; pp. 1-14.

Zhu et al., U.S. Appl. No. 12/014,513, filed Jan. 15, 2008, entitled "Three-Dimensional Annotations for Street View Data".

Kadobayashi, R., et al., "Combined Use of 2D Images and 3D Models for Retrieving and Browsing Digital Archive Contents", *Videometrics VIII*, Proceedings of the SPIE—The International Society for Optical Engineering, San Jose, CA, 2005, 10 pages.

International Search Report and Written Opinion for International Patent Application PCT/US2009/001216, European Patent Office, Netherlands, completed Sep. 8, 2009, mailed Sep. 21, 2009, 20 pages.

Snavely, Noah et al., "*Photo tourism: Exploring Photo Collections in 3D*," ACM Transactions on Graphics (SIGGRAPH Proceedings), 25(3), 2006, pp. 835-846.

Web Archive Capture (Feb. 26, 2008), http://phototour.cs.washington.edu/.

Wei et al., "A Panoramic Image-Based Approach to Virtual Scene Modeling," Oct. 2006.

International Preliminary Report on Patentability, dated Sep. 10, 2010, International Patent Application No. PCT/US2009/001216, The International Bureau of WIPO, Geneva, Switzerland, 11 pages.

Notification of the First Office Action, dated Mar. 30, 2012, Chinese Patent Application 200980114885.5, The State Intellectual Property Office of the People's Republic of China, 7 pages (English language translation appended).

Notification of the Third Office Action, dated Feb. 25, 2013, Chinese Patent Application 200980114885.5, The State Intellectual Property Office of the People's Republic of China, 7 pages (English language translation appended).

First Office Action, dated Apr. 1, 2013, Japanese Patent Application No. 2010-548720, Japanese Patent Office, 7 pages (English language translation appended).

Xu Huaiyu et al: "A Virtual Community Building Platform Based on Google Earth", Hybrid Intelligent Systems, 2009. HIS '09. Fifth International Conference On, IEEE, Piscataway, NJ, USA, Aug. 12, 2009, pp. 349-352, XP031529801.

* cited by examiner

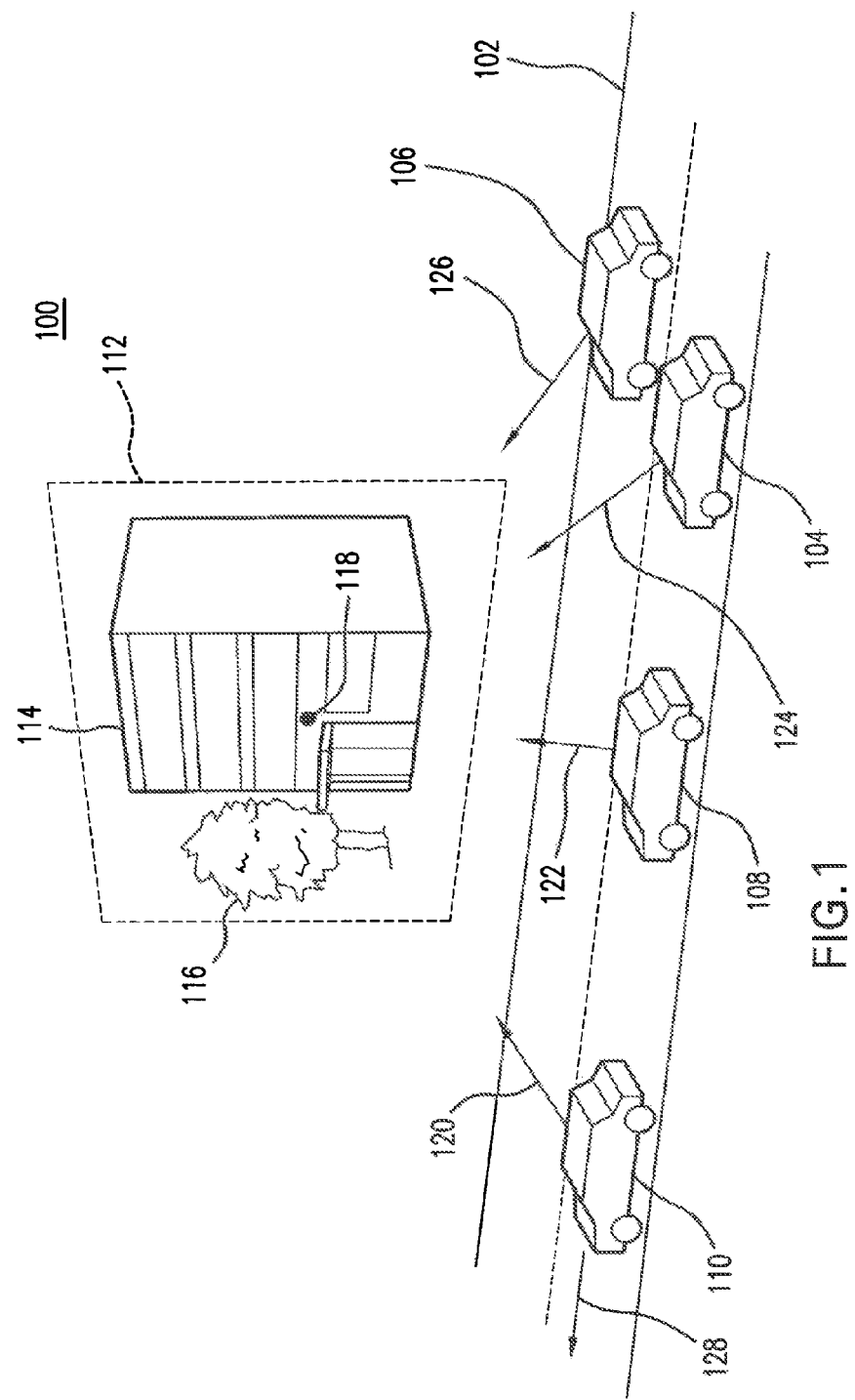

US 8,963,915 B2

USING IMAGE CONTENT TO FACILITATE NAVIGATION IN PANORAMIC IMAGE DATA

CROSS-REFERENCE TO RELATED APPLICATION

The present application is a continuation of U.S. patent application Ser. No. 12/038,325, filed Feb. 27, 2008, which issued as U.S. Pat. No. 8,525,825 on Sep. 3, 2013, the disclosure of which is incorporated herein by reference.

FIELD OF THE INVENTION

The present invention relates to navigating between panoramic images.

BACKGROUND OF THE INVENTION

Computer systems exist that include a plurality of panoramic images geo-coded to locations on a map. To navigate between neighboring panoramic images, the user may select a button on a map and a new neighboring panoramic image may be loaded and displayed. Although this technique has benefits, jumping from one image to the next image can be distracting to a user. Accordingly, new navigation methods and systems are needed.

BRIEF SUMMARY

The present invention relates to using image content to facilitate navigation in panoramic image data. In a first embodiment, a computer-implemented method for navigating in panoramic image data includes: (1) determining an intersection of a ray and a virtual model, wherein the ray extends from a camera viewport of an image and the virtual model comprises a plurality of facade planes; (2) retrieving a panoramic image; (3) orienting the panoramic image to the intersection; and (4) displaying the oriented panoramic image.

In a second embodiment, a method for creating and displaying annotations includes (1) creating a virtual model from a plurality of two-dimensional images; (2) determining an intersection of a ray and the virtual model, wherein the ray extends from a camera viewport of a first image; (3) retrieving a panoramic image; (4) orienting the panoramic image to face the intersection; and (5) displaying the panoramic image.

In a third embodiment, a system creates and displays annotations corresponding to a virtual model, wherein the virtual model was created from a plurality of two-dimensional images. The system includes a navigation controller that determines an intersection of a ray, extended from a camera viewport of a first image, and a virtual model, retrieves a third panoramic image and orients the third panoramic image to face the intersection. The virtual model comprises a plurality of facade planes.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 1 is a diagram that illustrates using image content to facilitate navigation in panoramic image data according to an embodiment of the present invention.

FIG. 2A-D are diagrams that demonstrate ways to facilitate navigation in panoramic image data in greater detail.

Figure 4:
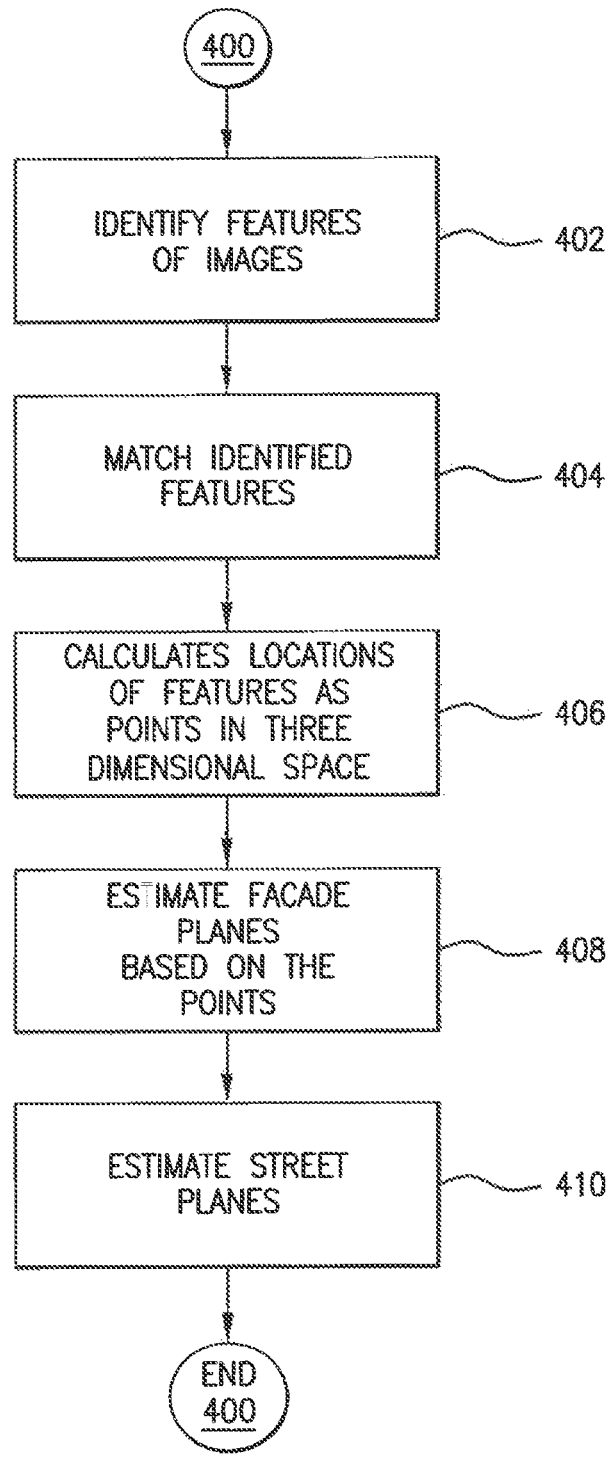
FIG. 4 is a flowchart that illustrates a method for creating a virtual model from image data according to an embodiment of the present invention.
Figure 5A:
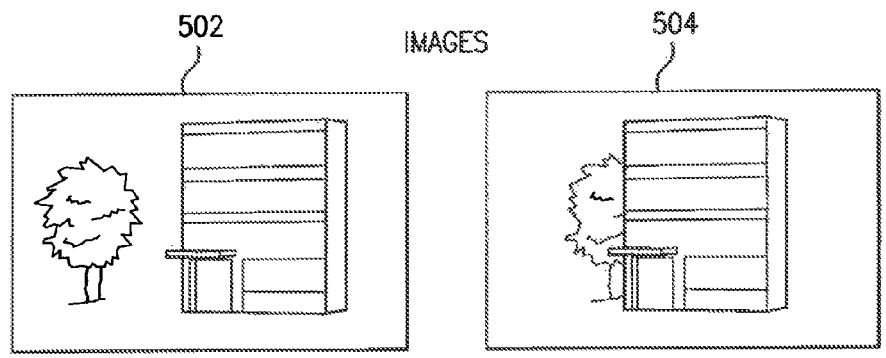
Figure 5B:
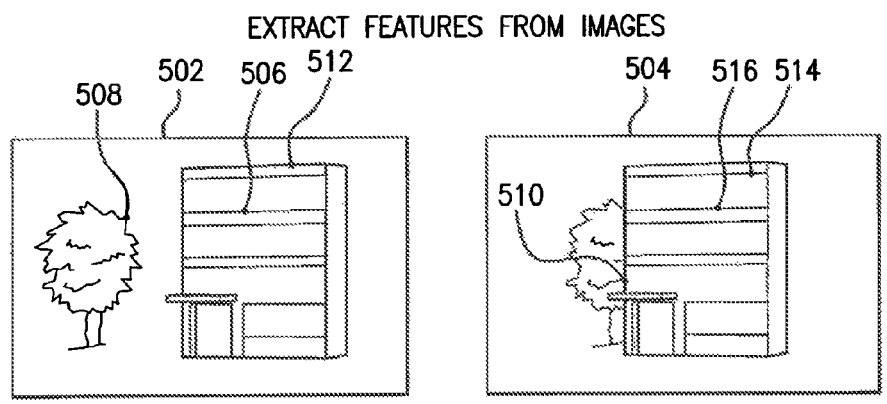
Figure 5C:
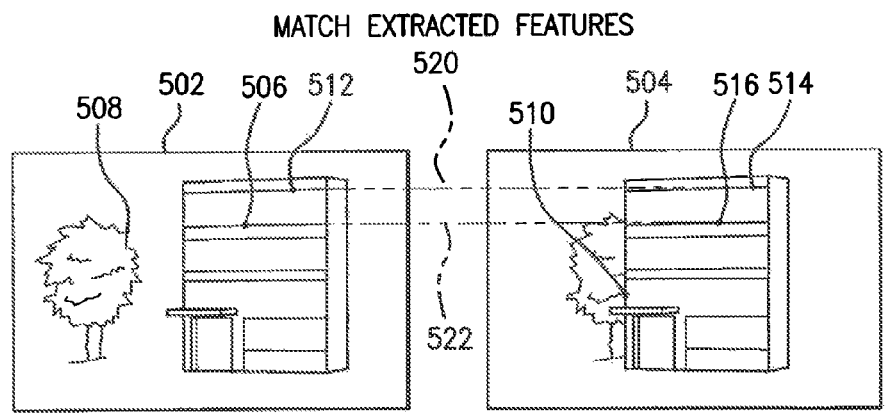

FIGS. 5A-C are diagrams that illustrate finding matching features according to the method of FIG. 4.

Figure 6:
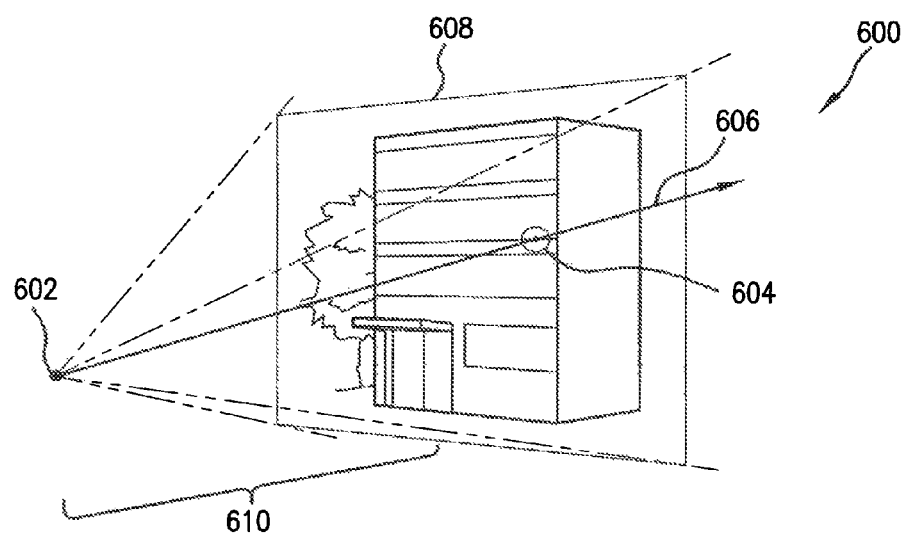
Figure 7:
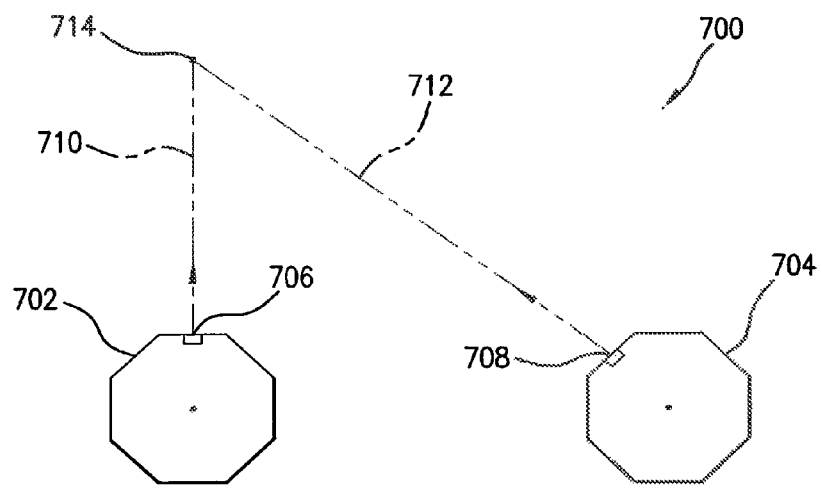

FIGS. 6-7 are diagrams that illustrate determining a point based on a pair of matching features according to the method in FIG. 4.

Figure 8A:
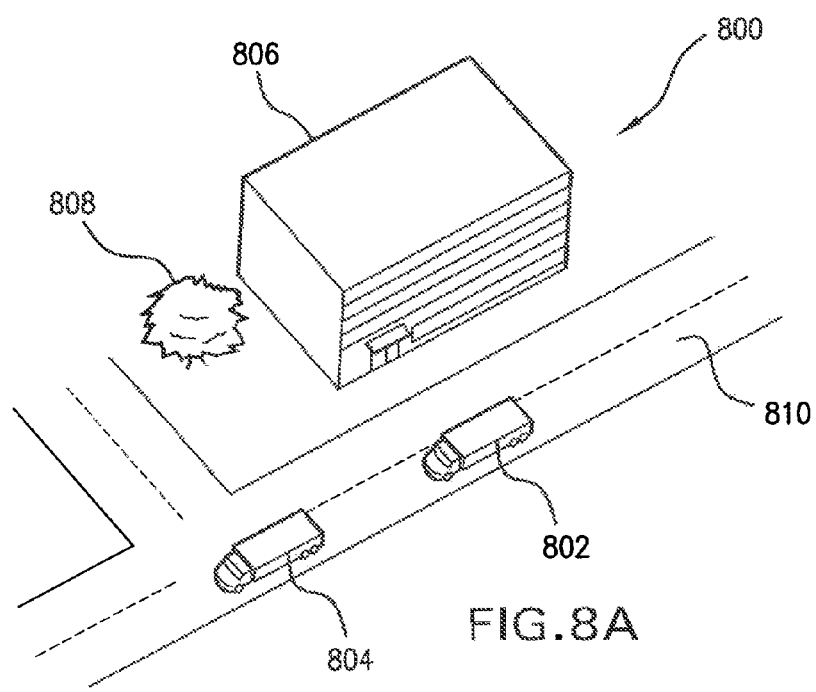
Figure 8B:
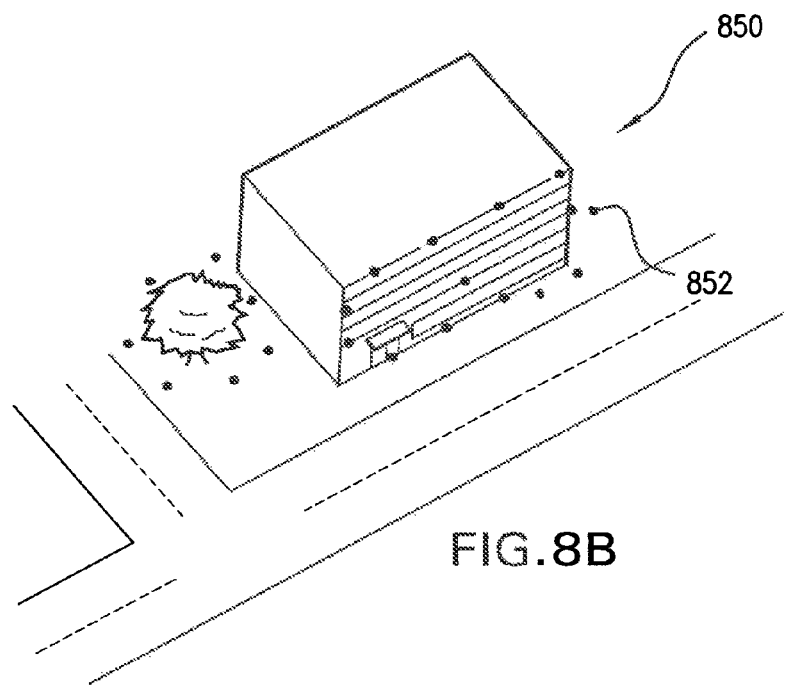

FIGS. 8A-B are diagrams that illustrate a plurality of points determined according to the method of FIG. 4.

Figure 9A:
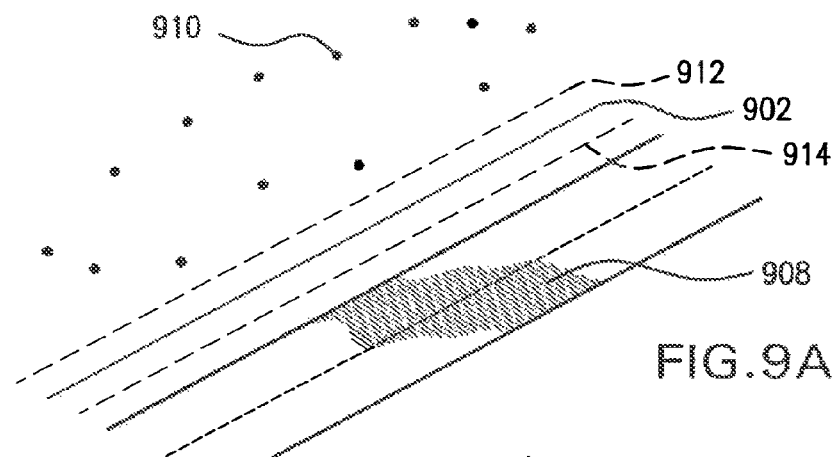
Figure 9B:
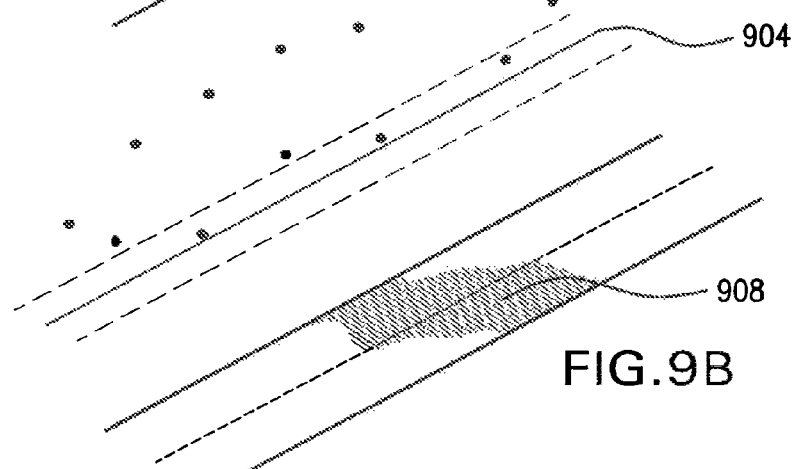
Figure 9C:
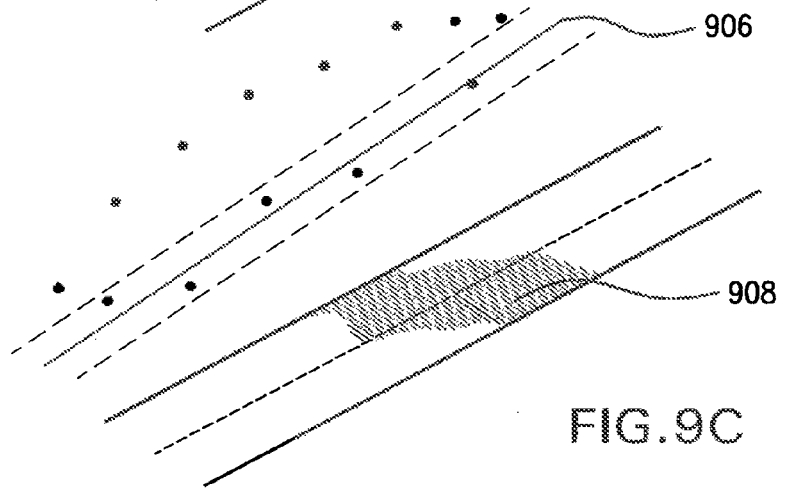

FIGS. 9A-C are diagrams that illustrate determining a surface based on a plurality of points according to the method of FIG. 4.

Figure 10:
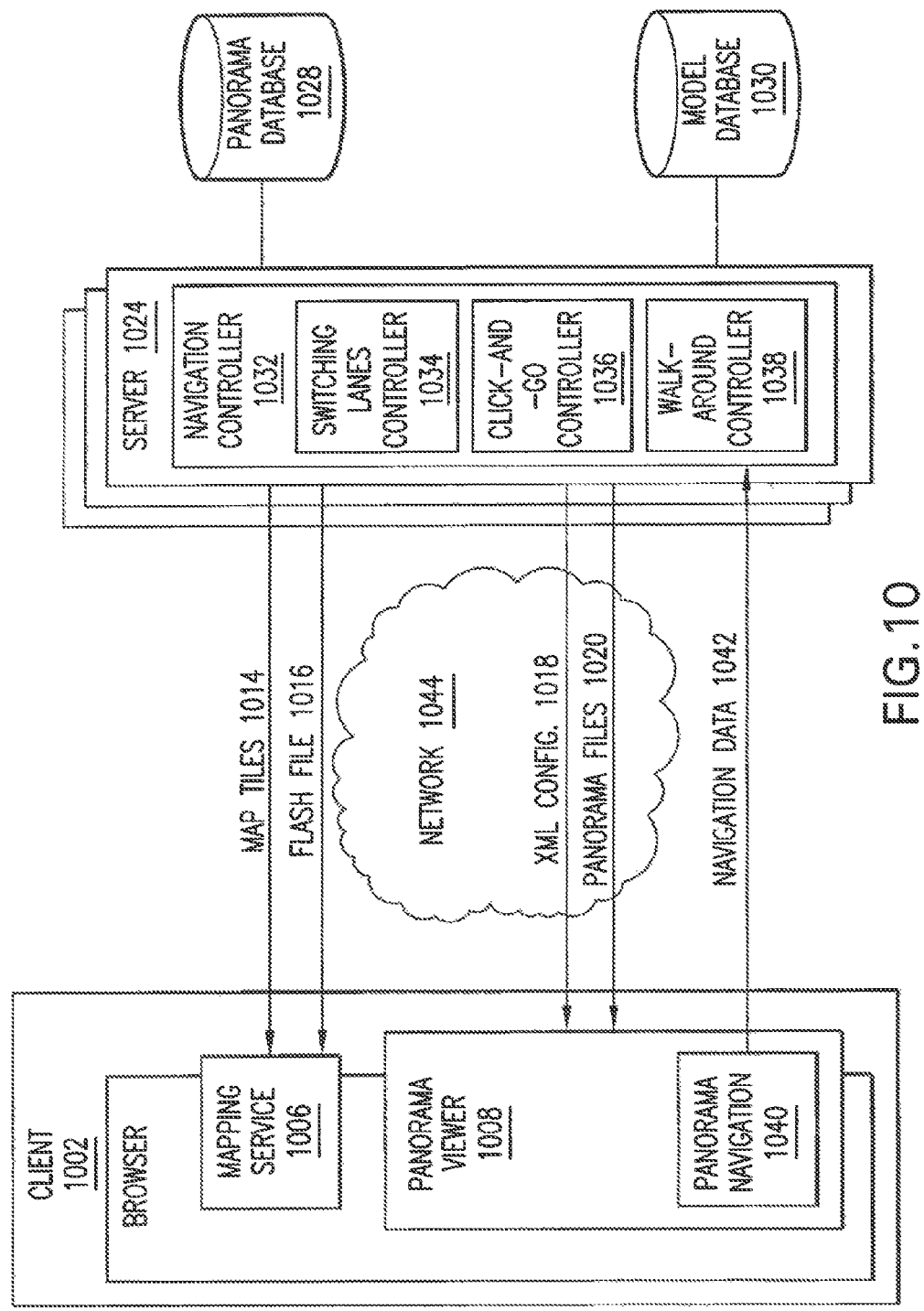

FIG. 10 is a diagram that shows a system for using a virtual model to navigate within in image data according to an embodiment of the invention.

Figure 11:
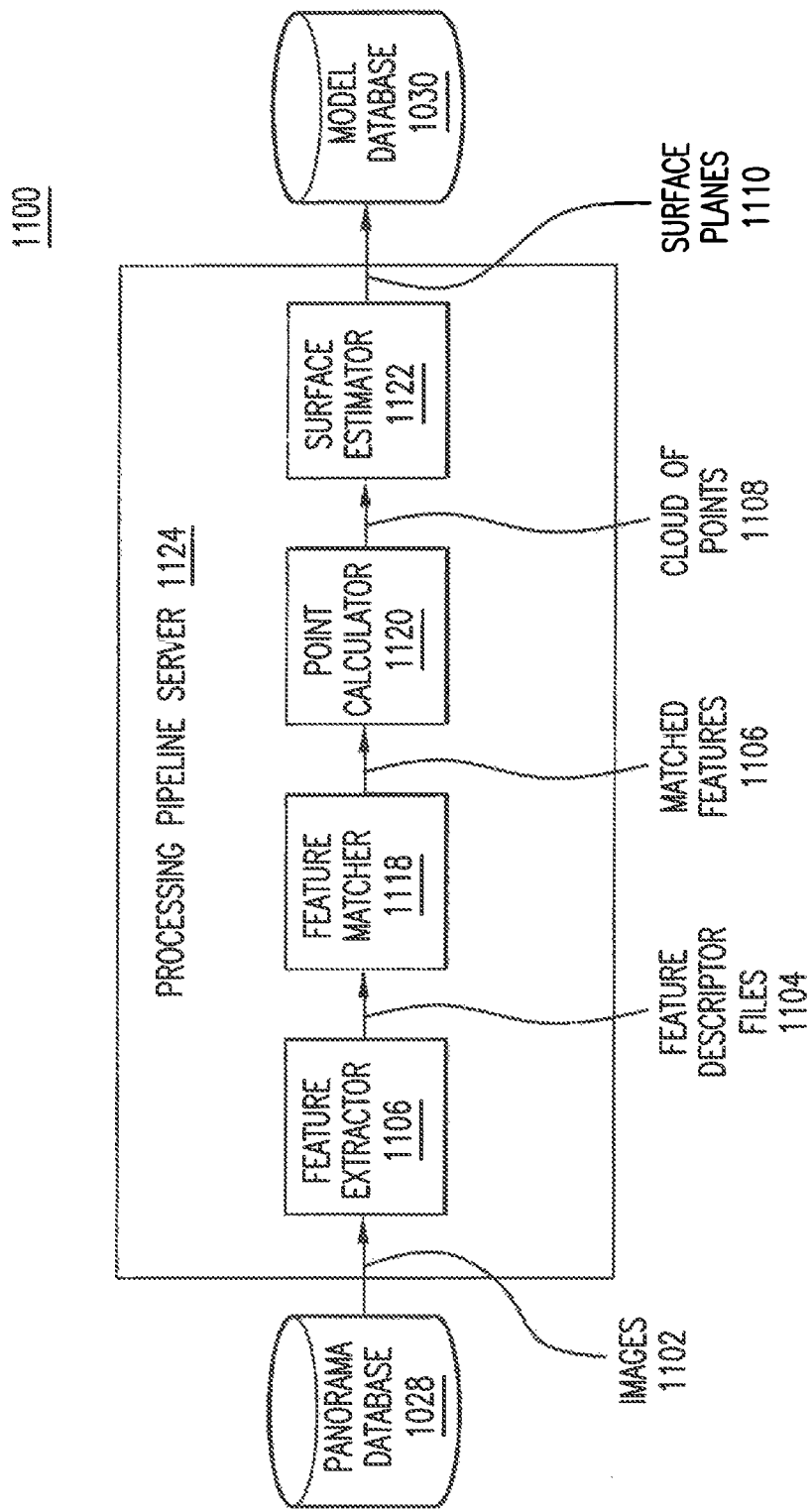

FIG. 11 is a diagram that shows a system for creating a virtual model from image data according to an embodiment of the invention.

The drawing in which an element first appears is typically indicated by the leftmost digit or digits in the corresponding reference number. In the drawings, like reference numbers may indicate identical or functionally similar elements.

DETAILED DESCRIPTION OF THE INVENTION

The present invention relates to using image content to facilitate navigation in panoramic image data. In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As described herein, embodiments of the present invention enables users to navigate between panoramic images using image content. In one embodiment, a model is created representing the image content. A user may select an object contained in a first panoramic image. The location of the object is determined by projection the user's selection onto the model. A second panorama is selected and/or oriented according to that location. In this way, embodiments of this invention enable users to navigate between the first and second panorama using image content.

FIG. 1 is a diagram 100 that illustrates using image content to facilitate navigation in panoramic image data according to an embodiment of the present invention. Diagram 100 shows a building 114 and a tree 116. The locations of building 114 and tree 116 are approximated by a virtual model 112. Virtual model 112 may be a three dimensional model generated using images taken of building 114 and tree 116, as is described below. A street 102 runs alongside building 114 and tree 116.

Several avatars (e.g., cars) 104, 106, 108, and 110 are shown at locations on street 102. Each avatar 104, 106, 108, and 110 has an associated panoramic image geo-coded to the avatar's location on street 102. The panoramic image may include content 360 degrees around the avatar. However, only a portion of the panorama may be displayed to a user at a time, for example, through a viewport. In diagram 100, the portion of the panorama displayed to the user is shown by the each avatar's orientation. Avatars 104, 106, 108, and 110 have orientations 124, 126, 122, 120 respectively.

Avatar 104 has orientation 124 facing a point 118. Avatar 104's viewport would display a portion of a panorama geo-coded to the location of the avatar 104. The portion of the panorama displayed in the viewport would contain a point 118. Embodiments of the present invention use virtual model 112 to navigate from the position of avatar 104 to the positions of avatar 106, 108, and 110, In a first embodiment of the present invention, hereinafter referred to as the switching lanes embodiment, a user may navigate between lanes. The switching lanes embodiment enables a user to navigate from avatar 104's panorama to avatar 106's panorama. Avatar 106's panorama is geo-coded to a location similar to avatar 104's panorama, but in a different lane of street 102. Because the panorama is geo-coded to a different location, if avatar 104 and avatar 106 had the same orientation, then their corresponding viewports would display different content. Changing content displayed in the viewport can be disorienting to the user. The switching lanes embodiment orients avatar 106 to face point 118 on virtual model 112. In this way, the portion of the panorama displayed in avatar 106's viewport contains the same content as the portion of the panorama displayed in avatar 104's viewport. In this way, the switching lanes embodiment makes switching between lanes less disorienting.

In a second embodiment of the present invention, hereinafter referred to as the walk-around embodiment, a user may more easily view an object from different perspectives. The user may get the sense that he/she is walking around the object. The walk-around embodiment enables a user to navigate from avatar 104's panorama to avatar 108's panorama. The location of avatar 108 may be, for example, selected by the user. For example, a user may select the location of avatar 108 by selecting a location on a map or pressing a arrow button on a keyboard. Because the panorama is geo-coded to a different location, if avatar 104 and avatar 106 had the same orientation, then their corresponding viewports would display different content, and an object of interest displayed in avatar 104's viewport may not by be displayed in avatar 106's viewport. The walk-around embodiment orients avatar 108 to face point 118 on virtual model 112. In this way, the portion of the panorama displayed in avatar 106's viewport contains the same content as the portion of the panorama displayed in avatar 104's viewport. As result, the user may more easily view an object from different perspectives.

In an embodiment, a transition may be displayed to the user between avatar 104 and avatar 108. The transition may show intermediate panoramas for avatar positions between avatar 104 and avatar 108. The intermediate panoramas may be oriented to face point 118 as well.

In a third embodiment, hereinafter referred to as the click-and-go embodiment, a user may navigate to a second panoramic image at a new location according to the location of an object of a first panorama. The click-and-go embodiment enables a user to navigate from avatar 104's panorama to an avatar 110's panorama. The position of avatar 110 is the position of the closest available panorama to point 118 on virtual model 112. Point 118 may be determined according to a selection by the user in the first panorama.

In embodiments, avatar 110 may have an orientation 120 facing point 118 or a different orientation 128. Orientation 128 may be the orientation of the orientation of street 102.

By selecting avatar 110 according to point 118 on virtual model 112, the click and go embodiment uses virtual model 112 to navigate between panoramic images. As is described below, in an embodiment, virtual model 112 is generated using the content of panoramic images.

In an example, the click and go embodiment may enable a user to get a closer look at an object. In the example, the user may select an object in a first panorama and a second panorama close to the object is loaded. Further, the portion of the second panorama containing the object may be displayed in the viewport. In this way, using the content of the panoramic images to navigate between panoramic images creates a more satisfying and less disorienting user experience.

In an embodiment, a panorama viewer may display a transition between avatar 104 and avatar 108. The transition may display intermediate panoramas for avatar positions between avatar 104 and avatar 108. The intermediate panoramas may be oriented to face point 118 as well.

FIGS. 2A-D are diagrams that demonstrate ways to facilitate navigation in panoramic image data in greater detail.

Figure 2A:
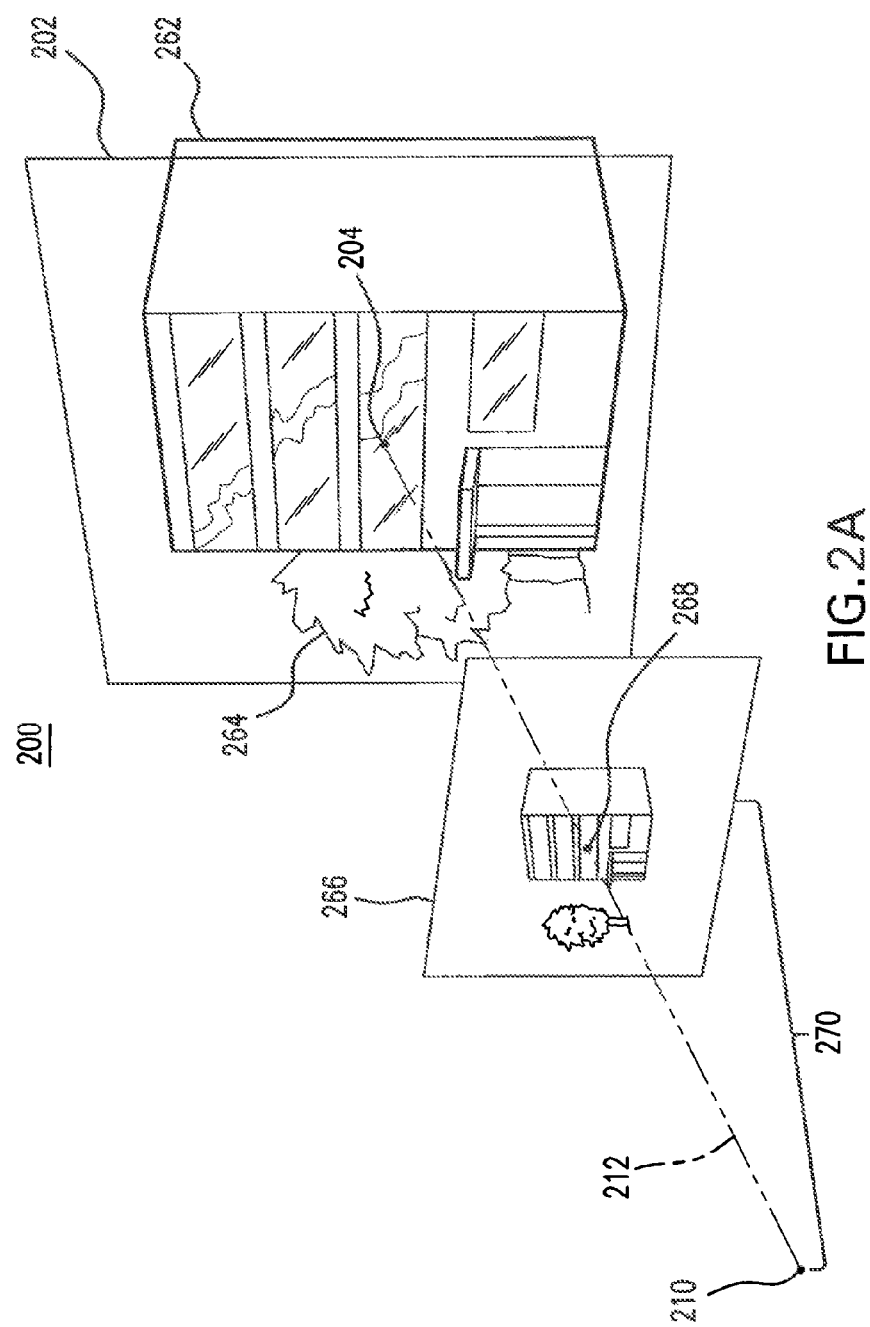

FIG. 2A is a diagram 200 that shows how a point on a model, such as point 118 in FIG. 1, may be generated. Diagram 200 shows a building 262 and a tree 264. A virtual model 202 represents building 262 and tree 264. Model 202 may be generated using image content, as is described in detail below. Diagram 200 also shows an image 266 taken of building 262 and tree 264. Image 266 may be a portion of a panoramic image taken from street level displayed to a user through a viewport. A point 268 is shown on image 266. In some embodiments, such as the switching lanes and walk-around embodiments, point 268 may be the center of image 266. In other embodiments, such as the click-and-go embodiment, point 268 may be selected by a user using an input device, such as a mouse.

A ray 212 is extended from a camera viewpoint 210 through point 268. In an example, camera viewpoint 210 may be the focal point of the camera used to take photographic image 266. In that example, the distance between image 266 and camera viewpoint 210 is focal length 270.

A point 204 is the intersection between ray 212 and virtual model 202. Point 204 may be used to navigate between street level panoramic images, as is shown in FIGS. 2B-D.

Figure 2B:
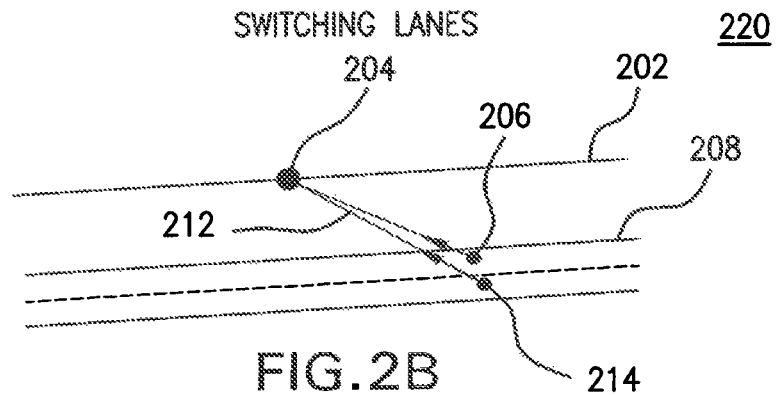

FIG. 2B is a diagram 220 that shows an example of the switching lanes embodiment. Ray 212 and point 204 on model 202 are determined using an image having a location 214 on a street 208. A panoramic image taken from location 206 close to location 214, but in a different lane of street 208, is also identified in FIG. 2B. The panoramic image having location 206 is oriented to face point 204.

Figure 2C:
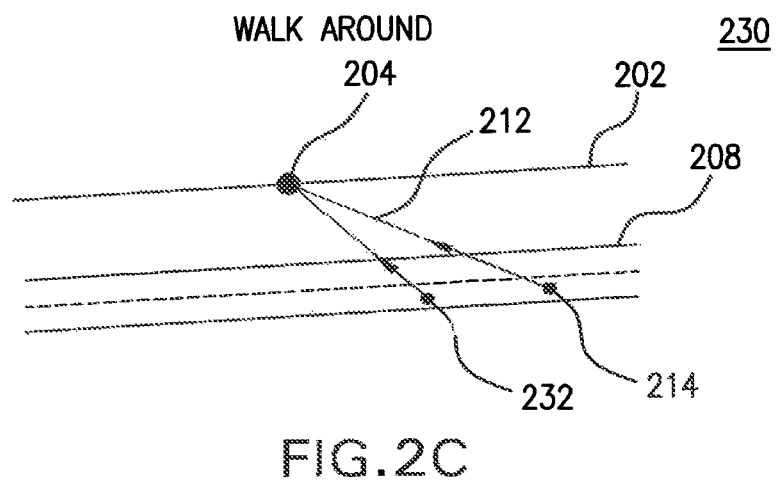

FIG. 2C is an diagram 230 that shows an example of the walk-around embodiment. Ray 212 and point 204 on model 202 are determined using an image taken from a location 214. A panoramic image having a location 232 may be selected, for example, by a user. The panoramic image having location 232 is oriented to face point 204.

Figure 2D:
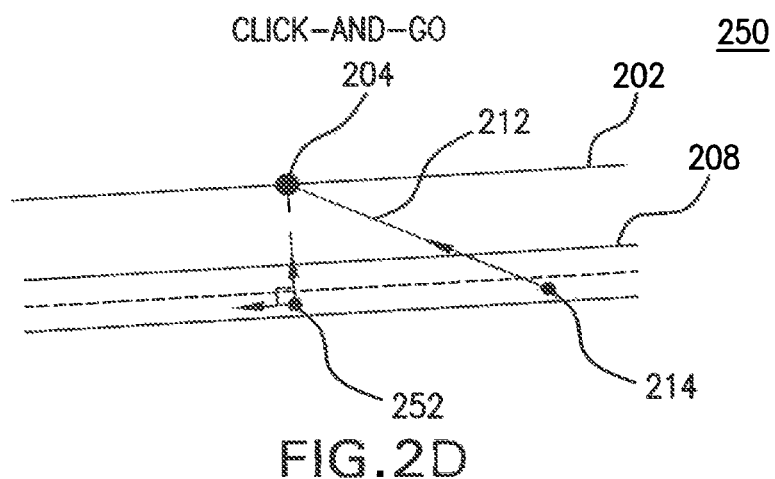

FIG. 2D is a diagram 250 that shows an example of the click-and-go embodiment. Ray 212 and point 204 on model 202 are determined using an image having a location 214. A panoramic image is selected that has a location 252, close to location 204. In an example, point 204 may be normal to street 208 from a location 252, as shown in FIG. 2D. In another example, location 252 may be normal to virtual model 202 from point 204. The panoramic image having location 252 may be oriented to face point 204 or may be oriented to face the direction of street 208.

Figure 3:
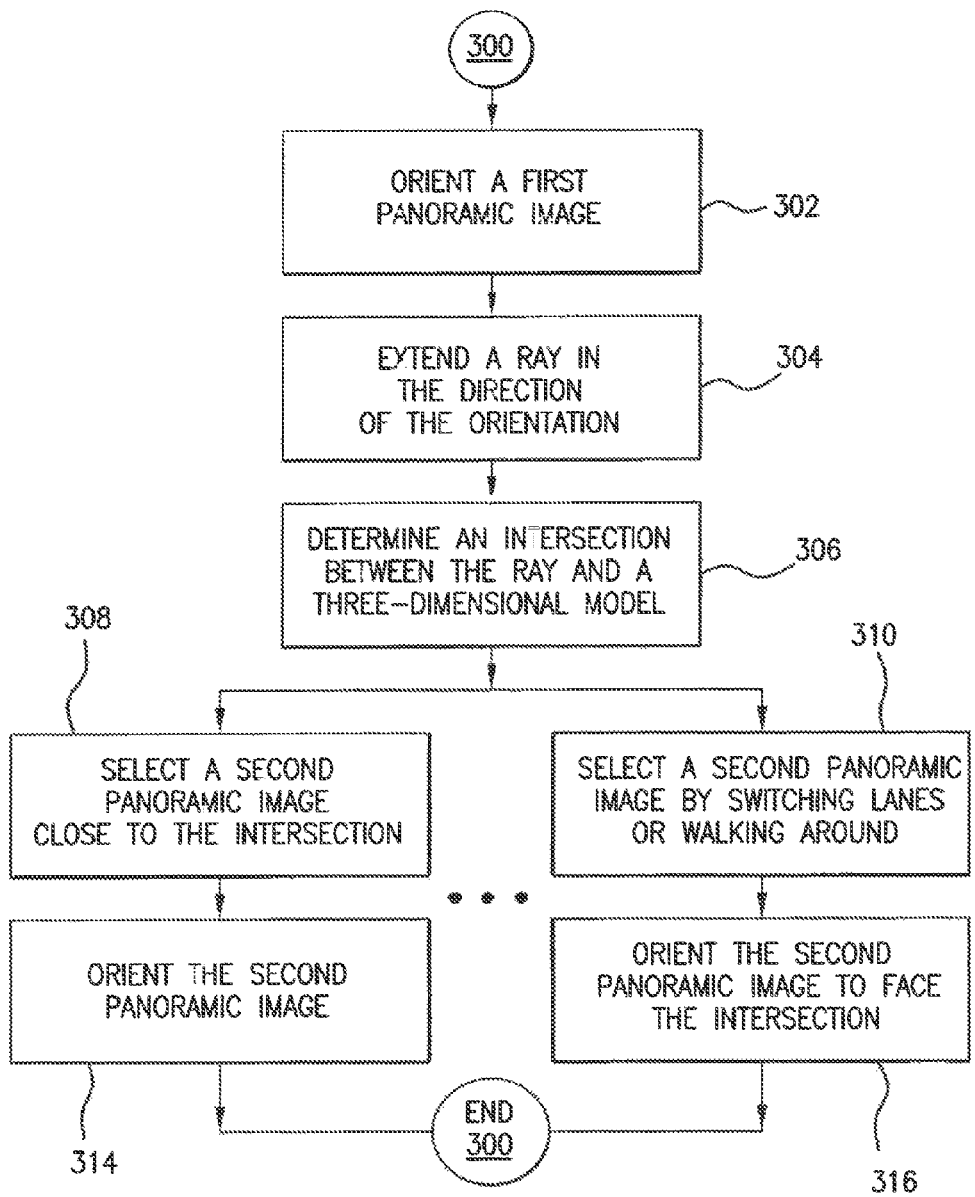
FIG. 3 is a flowchart that illustrates a method for navigating within panoramic image data according to an embodiment of the present invention.

FIG. 3 is a flowchart that demonstrates a method 300 for navigating within panoramic image data according to an embodiment of the present invention. Method 300 starts with orienting a first panoramic image at step 302. At step 304, a ray is extended in the direction of the orientation of the first panoramic image, as described for example with respect to FIG. 2A. A ray may also be determined according to a user-selected point on the panoramic image. At step 306, an intersection is determined between the ray and a virtual model. The virtual model may be determined using image content.

In embodiments, the intersection may be used in several ways to navigate between panoramic images. For example, in the switching lanes or walk around embodiments, a second panoramic image may be selected at step 310. In the switching lanes embodiment, the second panoramic image has a location similar to the first panoramic image, but in a different lane. In the walk-around embodiment, the second panoramic image may be selected, for example, by a user. The second panoramic image is oriented to face the intersection at step 316. After step 316, method 300 ends.

In the click and go embodiment, a second panoramic image may be such that it is close to the intersection (for example, within a selected or pre-defined distance of the intersection) at step 308, as described with respect to FIG. 2D. At step 314, the second panoramic image may be oriented to face the intersection, or the second panoramic image may be oriented in other directions. For example, the second panoramic image may be oriented in the direction of the street. After step 314, method 300 ends.

FIG. 4 is a flowchart that demonstrates a method 400 for creating a virtual model from image data according to an embodiment of the invention.

Method 400 starts with step 402. In step 402, features of images are identified. In an embodiment, the features are extracted from the images for subsequent comparison. This is described in more detail below with respect to FIGS. 5A-B. In one embodiment, the images that are used are street level panoramic images that are taken from nearby locations to one another along a route of travel.

In step 404, features in neighboring images are matched. In an embodiment, matching features may include constructing a spill tree. This is described in more detail below with respect to FIG. 5C.

In step 406, the locations of features are calculated, for example, as points in three-dimensional space. In an embodiment, points are determined by computing stereo triangulations using pairs of matching features as determined in step 404. How to calculate points in three-dimensional space is described in more detail below with respect to FIGS. 6-7. The result of step 406 is a cloud of points.

In step 408, facade planes are estimated based on the cloud of points calculated in step 406. In an embodiment, step 408 may comprise using an adaptive optimization algorithm or best fit algorithm. In one embodiment, step 408 comprises sweeping a plane, for example, that is aligned to a street as is described below with respect to FIG. 9.

In step 410, street planes are estimated based on the location of streets. These street planes together with the facade planes estimated in step 408 are used to form a virtual model corresponding to objects shown in a plurality of two-dimensional images.

FIGS. 5A-C illustrate an example of how to identify and match features in images according to method 400.

FIG. 5A depicts an image 502 and an image 504. Image 502 and image 504 represent, for example, two photographs of the same building and tree from different perspectives. In an embodiment, image 502 and image 504 may be portions of street level panoramic images. The two images 502 and 504 may be taken from nearby locations, but with different perspectives.

In one embodiment, images 502 and 504 may be taken from a moving vehicle with a rosette of eight cameras attached. The eight cameras take eight images simultaneously from different perspectives. The eight images may be subsequently stitched together to form a panorama. Image 502 may be an unstitched image from a first camera in the eight camera rosette directed perpendicular to the vehicle. Image 504 may be an unstitched image from a second camera adjacent to the first camera taken during a later point in time.

FIG. 5B illustrates image 502 and image 504 with representative features identified/extracted according to step 404 of method 400. Image 502 includes representative features 506, 508, and 512. Image 504 includes representative features 510, 514, and 516. While only six representative features are shown, in practice there may be thousands of features identified and extracted for each image.

In an embodiment, the step of extracting features may include interest point detection and feature description. Interest point detection detects points in an image according to a condition and is preferably reproducible under image variations such as variations in brightness and perspective. The neighborhood of each interest point is a feature. Each feature is represented by a feature descriptor. The feature descriptor is preferably distinctive.

In an example, a Speeded Up Robust Features (SURF) algorithm is used to extract features from neighboring images. The SURF algorithm is described, for example, in Herbert Bay, Tinne Tuytelaars, Luc Van Gool, "SURF: Speeded Up Robust Features", *Proceedings of the Ninth European Conference on Computer Vision*, May 2006. The SURF algorithm includes an interest point detection and feature description scheme. In the SURF algorithm, each feature descriptor includes a vector. In one implementation, the vector may be 128-dimensional. In an example where the images are panoramas taken from street level, the SURF algorithm may extract four to five thousand features in each image, resulting in a feature descriptor file of one to two megabytes in size.

FIG. 5C illustrates extracted features being matched. FIG. 5C depicts a match 520 and match 522. Match 520 includes feature 512 and feature 514. Match 522 includes feature 506 and feature 516. As represented in FIG. 5C, not every feature in image 502 has a matching feature in image 504 and vice versa. For example, feature 508 in image 502 does not have a matching feature in image 504, because feature 508 shows a portion of a tree that is obscured in image 504. In another example, feature 510 in image 504 does not have a match in image 502, for example, because of an imprecision in the feature identification. The feature identification should be as precise as possible. However, due to variations in lighting, orientation, and other factors, some imprecision is likely. For this reason, a feature matching scheme is required that compensates for the imprecision. An example feature matching scheme is described below.

In an embodiment, each feature such as feature 512 is represented by a feature descriptor. Each feature descriptor includes a 128-dimensional vector. The similarity between a first feature and a second feature may be determined by finding the Euclidean distance between the vector of the first feature descriptor and the vector of the second feature descriptor.

A match for a feature in the first image among the features in the second image may be determined, for example, as follows. First, the nearest neighbor (e.g., in 128-dimensional space) of a feature in the first image is determined from among the features in the second image. Second, the second-nearest neighbor (e.g., in 128 dimensional-space) of the feature in the first image is determined from among the features in the second image. Third, a first distance between the feature in the first image and the nearest neighboring feature in the second image is determined, and a second distance between the feature in the first image and the second nearest neighboring feature in the second image is determined. Fourth, a feature similarity ratio is calculated by dividing the first distance by the second distance. If the feature similarity ratio is below a particular threshold, there is a match between the feature in the first image and its nearest neighbor in the second image.

If the feature similarity ratio is too low, not enough matches are determined. If the feature similarity ratio is too high, there are too many false matches. In an embodiment, the feature similarity ratio may be between 0.5 and 0.95 inclusive.

In an embodiment, the nearest neighbor and the second nearest neighbor may be determined by constructing a spill tree of the features in the second image. The spill tree closely approximates the nearest neighbors and efficiently uses processor resources. In an example where the images being compared are panoramic images taken from street level, there may be hundreds of pairs of matched features for each pair of images. For each pair of matched features, a point in three-dimensional space can be determined, for example, using stereo triangulation.

FIGS. 6 and 7 illustrate an example of determining a point in three-dimensional space based on matched features using three-dimensional stereo triangulation. In an embodiment, this technique is used, for example, to implement step 406 of method 400. To determine a point in three-dimensional space corresponding to a pair of matched features, rays are constructed for the pair of matched features and the point is determined based on the intersection of the rays. This is described in more detail below.

FIG. 6 shows an example 600 that illustrates how a ray is formed. As shown in FIG. 6, a ray 606 can be formed by projecting or extending a ray from a camera viewpoint 602 of image 608 through a feature 604 of image 608. In example 600, camera viewpoint 602 corresponds to the focal point of the camera used to take image 608. The distance between image 608 and camera viewpoint 602 is equal to focal length 610.

After a ray for each of the matching features is formed, a point in three-dimensional space may be determined. FIG. 7 illustrates an example 700 depicting how a point is determined.

In example 700, two camera rosettes 702 and 704 are shown. In an embodiment, these two camera rosettes can be the same (e.g., the same camera rosette can be used to take images at different locations and at different points in time). Each camera rosette 702 and 704 includes an image with a matched feature. In example 700, camera rosette 702 includes a feature 706 that is matched to a feature 708 of camera rosette 704. As shown in FIG. 7, a first ray 710 is formed by extending ray 710 from the camera viewpoint of camera rosette 702 through feature 706. Similarly, a second ray 712 is formed by extending ray 712 from the camera viewpoint of camera rosette 704 through feature 708. The intersection of ray 710 and ray 712 is a three-dimensional point 714. In embodiments, for example, due to imprecision in feature identification and matching, rays 710 and 712 may not actually intersect at a point 714. If rays 710 and 712 do not actually intersect, a line segment where the rays are closest can be determined. In these situations, the three-dimensional point 714 used may be the midpoint of the line segment.

In embodiments, as described above, the steps illustrated by examples 600 and 700 are repeated for each pair of matched features to determine a cloud of three-dimensional points.

FIG. 8A shows an example 800 of three-dimensional space that includes a building 806 and a tree 808. Example 800 also includes a street 810. In an embodiment, photographic images of building 806 and tree 808 may be taken from a vehicle moving along street 810. A first photographic image may be taken from a position 802, while a second photographic image may be taken from a position 804.

As described herein, in accordance with an embodiment of the present invention, features are extracted from the first and second images. Matching features are identified, and for each pair of matching features, a three-dimensional point is determined, for example, using stereo triangulation. This results in a cloud of three-dimensional points, such as those illustrated in FIG. 8B. FIG. 8B illustrates an example 850 in which a cloud of three-dimensional points 852 are depicted.

FIGS. 9A-C illustrate an example of how to determine a facade surface based on a plurality of points in three-dimensional space. This example is merely illustrative and can be used, for example, to implement step 408 of method 400. In other embodiments, the surface may be determined using a best-fit or regression analysis algorithm such as, for example, a least-squares or an adaptive optimization algorithm. Examples of adaptive optimization algorithms include, but are not limited to, a hill-climbing algorithm, a stochastic hill-climbing algorithm, an A-star algorithm, and a genetic algorithm.

FIG. 9A depicts a street 908 and a cloud of three-dimensional points 910. Running parallel to street 908 is a facade plane 902. In operation, facade plane 902 is translated outward on an axis from street 908. At each position moving outward, the number of points within a particular range of facade plane 902 is evaluated. In FIG. 9A, the range is shown by dotted lines 912 and 914. As shown in FIG. 9A, zero points are located between dotted lines 912 and 914.

FIG. 9B shows a facade plane 904 translated outward on an axis from street 908. In FIG. 9B, facade plane 904 has been moved outward from street 908 a greater distance than that of facade plane 902 shown in FIG. 9A. As a result, three points are within the range from facade plane 904.

In an embodiment, if a position for a facade plane (e.g., a position having a specified number of nearby points) is not found, the angle of the facade plane may be varied relative to the street. Accordingly, FIG. 9C shows a facade plane 906 that is at a non-parallel angle with respect to street 908. As shown in FIG. 9C, there are five points that are close to facade plane 906.

As described herein, a virtual model according to the present invention is formed from facade planes. The facade planes may be generated according to image content. In an embodiment, the model may also include one or more street planes (e.g., a plane parallel to the street). In an embodiment, a street plane may be calculated based on a known position of a street (e.g., one may know the position of the street relative to the camera used to take the images). The virtual model may be two-dimensional or three-dimensional.

FIG. 10 shows a system 1000 for using a three-dimensional model to navigate within image data according to an embodiment of the invention. As shown in FIG. 10, system 1000 includes a client 1002. Client 1002 communicates with one or more servers 1024, for example, across network(s) 1044. Client 1002 may be a general-purpose computer. Alternatively, client 1002 can be a specialized computing device such as, for example, a mobile telephone. Similarly, server(s) 1024 can be implemented using any computing device capable of serving data to client 1002.

Server 1024 may include a web server. A web server is a software component that responds to a hypertext transfer protocol (HTTP) request with an HTTP reply. As illustrative examples, the web server may be, without limitation, an Apache HTTP Server, an Apache Tomcat, a Microsoft Internet Information Server, a Moss Application Server, a WebLogic Application Server, or a Sun Java System Web Server. The web server may serve content such as hypertext markup language (HTML), extendable markup language (XML), documents, videos, images, multimedia features, or any combination thereof. This example is strictly illustrative and does not limit the present invention.

Server 1024 may serve map tiles 1014, a program 1016, configuration information 1018, and/or panorama tiles 1020 as discussed below.

Network(s) 1044 can be any network or combination of networks that can carry data communication, and may be referred to herein as a computer network. Network(s) 1044 can include, but is not limited to, a local area network, medium area network, and/or wide area network such as the Internet. Network(s) 1044 can support protocols and technology including, but not limited to, World Wide Web protocols and/or services. Intermediate web servers, gateways, or other servers may be provided between components of system 1000 depending upon a particular application or environment.

Server 1024 is coupled to a panorama database 1028 and model database 1030. Panorama database 1028 stores images. In an example, the images may be photographic images taken from street level. The photographic images taken from the same location may be stitched together to form a panorama. Model database 1030 stores a three-dimensional model corresponding to the images in panorama database 1028. An example of how the three-dimensional model may be generated is discussed in further detail below. Annotation database 1032 stores user-generated annotations.

Each of panorama database 1028, model database 1030, and annotation database 1032 may be implemented on a relational database management system. Examples of relational databases include Oracle, Microsoft SQL Server, and MySQL. These examples are illustrative and are not intended to limit the present invention.

Server 1024 includes a navigation controller 1032. Navigation controller 1032 uses a model in model database 1030 generated from image content to facilitate navigation between panoramas. Navigation controller 1032 receives input from a navigation data 1042. Navigation data 1042 contains data about the present position and orientation and data about the desired next position. For example, in the click and go embodiment, navigation data 1042 may contain a first panoramic image and the location in a first panoramic image where the user would like to go. Navigation data 1042 may be, for example, an HTTP request with data encoded as HTTP parameters.

In response to navigation data 1042, navigation controller 1032 determines the new panorama in panorama database 1028 based on the model in model database 1030. Navigation controller 1032 also determines the orientation to display a second panorama. Navigation controller 1032 outputs the new panorama and the orientation in configuration information 1018 and panorama tiles 1020.

Navigation controller 1032 may include a switching lanes controller 1034, a click-and-go controller 1036, and a walk-around controller 1038. Each of switching lanes controller 1034, click-and-go controller 1036, and walk-around controller 1038 responds to navigation data 1042 according to an embodiment of the present invention.

Switching lanes controller 1034 operates according to the switching lanes embodiment of the present invention. In response to navigation data 1042, switching lanes controller 1034 selects a second panoramic image from panorama database 1028. The second panoramic image is close to the location of the first panoramic image, but in a different lane. In an example, the second panoramic image may be the closest panoramic image in panorama database 1028 that exists in a different lane. Switching lanes controller 1034 determines a location in the model in model database 1030 according to the position and orientation of the first panorama in navigation data 1042. In an embodiment, to determine the location, switching lanes controller 1034 extends a ray from the position in the direction of the orientation, as described with respect to FIG. 2A. Switching lanes controller 1034 then determines an orientation of the second panorama, as described with respect to FIG. 2B. Finally, switching lanes controller 1034 returns the second panorama in panorama tiles 1020 and the orientation of the second panorama in configuration information 1018.

Click-and-go controller 1036 operates according to the click-and-go embodiment of the present invention. In response to navigation data 1042, click-and-go controller 1036 selects a second panoramic image from panorama database 1028. Click-and-go controller 1036 selects the second panoramic image based on a location in a first panoramic image from navigation data 1042. The location in the first panoramic image may be determined by a user input, such as a mouse. Click-and-go controller 1036 uses the location in first panoramic image to determine a location in the model in model database 1042, as described with respect to FIG. 2A. Click-and-go controller 1036 then selects a second panoramic image based on the location in the model. The second panoramic image is close to the location in the model, as described with respect to FIG. 2D. In an example, the second panoramic image may have the location such that the location on the model is normal to the street. In another example, the second panoramic image may have the location that is normal to the virtual model. Click-and-go controller 1036 then determines an orientation of the second panorama. The second panorama may be oriented to face the location in the model, or the second panorama may be oriented may be oriented in the direction of the street. Finally, click-and-go controller 1036 returns the second panorama in panorama tiles 1020 and its orientation in configuration information 1018.

Walk-around controller 1038 selects a second panoramic image from panorama database 1028 in response to navigation data 1042. The second panoramic image may be selected, for example, according to a position in navigation data 1042 entered by a user. Walk around controller 1038 determines a location in the model in model database 1030 according to the position and orientation of the first panorama in navigation data 1042. To determines the location, walk-around controller 1038 extends a ray from the position in the direction of the orientation, as described with respect to FIG. 2A. Walk-around controller 1038 determines an orientation of the second panorama, as described: above. Finally, walk-around controller 1038 returns the second panorama in panorama tiles 1020 and the orientation of the second panorama in configuration information 1018.

In an embodiment, client 1002 may contain a mapping service 1006 and a panorama viewer 1008. Each of mapping service 1006 and panorama viewer 1008 may be a standalone application or may be executed within a browser 1004. In embodiments, browser 1004 may be Mozilla Firefox or Microsoft Internet Explorer. Panorama viewer 1008, for example, can be executed as a script within browser 1004, as a plug-in within browser 1004, or as a program which executes within a browser plug-in, such as the Adobe (Macromedia) Flash plug-in.

Mapping service 1006 displays a visual representation of a map, for example, as a viewport into a grid of map tiles. Mapping system 1006 is implemented using a combination of markup and scripting elements, for example, using HTML and Javascript. As the viewport is moved, mapping service 1006 requests additional map tiles 1014 from server(s) 1024, assuming the requested map tiles have not already been cached in local cache memory. Notably, the server(s) which serve map tiles 1014 can be the same or different server(s) from the server(s) which serve panorama tiles 1020, configuration information 1018 or the other data involved herein.

In an embodiment, mapping service 1006 can request that browser 1004 proceed to download a program 1016 for a panorama viewer 1008 from server(s) 1024 and to instantiate any plug-in necessary to run program 1016. Program 1016 may be a Flash file or some other form of executable content. Panorama viewer 1008 executes and operates according to program 1016.

Panorama viewer 1008 requests configuration information 1018 from server(s) 1024. The configuration information includes meta-information about a panorama to be loaded, including information on links within the panorama to other panoramas. In an embodiment, the configuration information is presented in a form such as the Extensible Markup Language (XML). Panorama viewer 1008 retrieves visual assets 1020 for the panorama, for example, in the form of panoramic images or in the form of panoramic image tiles. In another embodiment, the visual assets include the configuration information in the relevant file format. Panorama viewer 1008 presents a visual representation on the client display of the panorama and additional user interface elements, as generated from configuration information 1018 and visual assets 1020. As a user interacts with an input device to manipulate the visual representation of the panorama, panorama viewer 1008 updates the visual representation and proceeds to download additional configuration information and visual assets as needed.

Each of browser 1004, mapping service 1006, and panorama viewer 1008 may be implemented in hardware, software, firmware or any combination thereof.

FIG. 11 shows a system 1100 for creating a virtual model from image data according to an embodiment of the invention. System 1100 includes panorama database 1028 and model database 1030 each coupled to a processing pipeline server 1124. Processing pipeline server 1124 may be any computing device. Example computing devices include, but are not limited to, a computer, a workstation, a distributed computing system, an embedded system, a stand-alone electronic device, a networked device, a mobile device, a rack server, a television, or other type of computing system.

Processing pipeline server 1124 includes a feature extractor 1116, a feature matcher 1118, a point calculator 1120, and a surface estimator 1122. Each of feature extractor 1116, feature matcher 1118, point calculator 1120, and surface estimator 1122 may be implemented in hardware, software, firmware or any combination thereof.

Feature extractor 1116 selects images 1102 from panorama database 1028. In an embodiment, images 1102 may include two images which are street level unstitched panoramic images. The two images may be taken from nearby location to one another, but from different perspectives. In an embodiment, the images are taken from a moving vehicle with a rosette of eight cameras attached. The eight cameras take eight images simultaneously from different perspectives. The eight images may be subsequently stitched together to form a panorama. The first image may be an unstitched image from a first camera in the eight camera rosette. The second image may be an unstitched image from a second camera adjacent to the first camera taken during a later point in time.

Feature extractor 1116 extracts features from images 1102. In an embodiment, feature extractor 1116 may perform more than one function such as, for example, interest point detection and feature description. Interest point detection detects points in an image according to conditions and is preferably reproducible under image variations such as variations in brightness and perspective. The neighborhood of each interest point is then described as a feature. These features are represented by feature descriptors. The feature descriptors are preferably distinctive.

In an example, a Speeded Up Robust Features (SURF) algorithm may be used to extract features from the images. The SURF algorithm includes an interest point detection and feature description scheme. In the SURF algorithm, each feature descriptor includes a vector. In one implementation, the vector may be 128-dimensional. In an example where the images are panoramas taken from street level, the SURF algorithm may extract four to five thousand features in each image, resulting in a feature descriptor file 1104 of one to two megabytes in size.

Feature matcher 1118 uses each feature descriptor file 1104 to match features in the two images. In an example, each feature is represented by a feature descriptor in feature descriptor file 1104. Each feature descriptor includes a 128-dimensional vector. The similarity between a first feature and a second feature may be determined by finding the Euclidean distance between the vector of the first feature and the vector of the second feature.

A match for a feature in the first image among the features in the second image may be determined as follows. First, feature matcher 1118 determines the nearest neighbor (e.g., in 118-dimensional space) of the feature in the first image determined from among the features in the second image. Second, feature matcher 1118 determines the second-nearest neighbor of the feature in the first image determined from among the features in the second image. Third, feature matcher 1118 determines a first distance between the feature in the first image and the nearest neighboring feature in the second image, and feature matcher 1118 determines a second distance between the feature in the first image and the second nearest neighboring feature in the second image. Fourth, feature matcher 1118 calculates a feature similarity ratio by dividing the first distance by the second distance. If the feature similarity ratio is below a particular threshold, there is a match between the feature in the first image and its nearest neighbor in the second image.

Feature matcher 1118 may determine the nearest neighbor and second nearest neighbor, for example, by constructing a spill tree.

If the feature similarity ratio is too low, feature matcher 1118 may not determine enough matches. If the feature similarity ratio is too high, feature matcher 1118 may determine too many false matches. In an embodiment, the feature similarity ratio may be between 0.5 and 0.95 inclusive. In examples where the images are panoramas taken from street level, there may be several hundred matched features. The matched features are sent to point calculator 1120 as matched features 1106.

Point calculator 1120 determines a point in three-dimensional space for each pair of matched features 1106. To determine a point in three-dimensional space, a ray is formed or determined for each feature, and the point is determined based on the intersection of the rays for the features. In an embodiment, if the rays do not intersect, the point is determined based on the midpoint of the shortest line segment connecting the two rays. The output of point calculator 1120 is a cloud of three-dimensional points 1108 (e.g., one point for each pair of matched features).

Surface estimator 1122 determines a facade plane based on the cloud of points 1108. Surface estimator 1122 may determine the facade plane by using a best-fit or regression analysis algorithm such as, for example, a least-squares or an adaptive optimization algorithm. Examples of adaptive optimization algorithms include, but are not limited to, a hill-climbing algorithm, a stochastic hill-climbing algorithm, an A-star algorithm; and a genetic algorithm. Alternatively, surface estimator 1122 may determine the facade surface by translating a plane to determine the best position of the plane along an axis, as described above with respect to FIGS. 9A-C.

Surface estimator 1122 may also determine more or more street planes. The street planes and the facade planes together form surface planes 1110. Surface estimator 1122 stores surface planes 1110 in model database 1030.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method for navigating in panoramic image data, comprising:

determining, by one or more computing devices, an intersection of a ray, extended from a camera viewport through a position of a first panoramic image, and a three-dimensional virtual model, wherein the position is selected by a user;

determining, by one or more computing devices and based on the intersection, a second panoramic image such that the second panoramic image is located according to the intersection of the ray and the three-dimensional virtual model;

retrieving, by one or more computing devices, the second panoramic image;

orienting, by one or more computing devices, the retrieved second panoramic image to face the intersection; and displaying, by one or more computing devices, the oriented second panoramic image to the user to navigate from the first panoramic image to the second panoramic image.

2. The method of claim 1, wherein the retrieving comprises retrieving the second panoramic image having a camera viewpoint with a user-selected location.

3. The method of claim 1, wherein the retrieving comprises retrieving the second panoramic image within a selected distance of the intersection.

4. The method of claim 1, wherein the second panoramic image comprises a photographic image taken from a street level.

5. The method of claim 1, further comprising:

creating the three-dimensional virtual model, by one or more computer systems, from contents of a plurality of two-dimensional images, the three-dimensional virtual model including a plurality of facade planes.

6. The method of claim 5, wherein the creating comprises:

identifying a first plurality of features of a first image and a second plurality of features of a second image;

determining a plurality of pairs of features, wherein each pair of the plurality of pairs of features includes a first feature from the first plurality of features and a second feature from the second plurality of features that matches the first feature;

determining a plurality of points corresponding to the plurality of pairs of features;

determining a facade plane based on the plurality of points;

determining a street plane corresponding to a location of a street; and creating the three-dimensional virtual model corresponding to the facade plane and the street plane.

7. The method of claim 6, wherein the identifying comprises using a Speeded Up Robust Features (SURF) algorithm.

8. The method of claim 7, wherein the determining a plurality of pairs of features comprises:

determining a spill tree for the first plurality of features;

searching the spill tree for an approximate nearest neighbor and an approximate second nearest neighbor of each feature in the second image; and comparing a feature similarity ratio of the approximate nearest neighbor and the approximate second-nearest neighbor to a threshold.

9. The method of claim 8, wherein the comparing comprises comparing a feature similarity ratio of the approximate nearest neighbor and the approximate second-nearest neighbor to a threshold between 0.5 and 0.95, inclusive.

10. The method of claim 6, wherein the determining a plurality of points comprises:

determining, for each pair of features of the plurality of pairs of features, a first ray extending from a first camera viewpoint of a first panoramic image through the first feature from the pair and a second ray extending from a second camera viewpoint of the second panoramic image through the second feature from the pair; and determining, for each pair of features of the plurality of pairs of features, a point corresponding to an intersection of the first ray and the second ray.

11. The method of claim 6, wherein the determining a facade plane comprises using a best fit or adaptive optimization algorithm.

12. A system for navigating in panoramic image data using a three-dimensional virtual model, wherein the three-dimensional virtual model was created from a plurality of two-dimensional images, comprising:

a computing device; and server, implemented by one or more computing devices, that includes a navigation controller that determines an intersection of a ray, extended from a camera viewport through a position of a first panoramic image, and the three-dimensional virtual model, wherein the three-dimensional virtual model comprises a plurality of facade planes and the position is selected by a user, and determines a second panoramic image such that the second panoramic image is located according to the intersection of the ray and the three-dimensional virtual model, retrieves the second panoramic image and orients the retrieved second panoramic image to face the intersection, and provides the retrieved and oriented second panoramic image for display to the user, whereby the navigation controller enables navigation from the first to the second panorama.

13. The system of claim 12, wherein the navigation controller comprises a switching lanes controller that determines a location of the camera viewport of the second panoramic image in a first lane different from a second lane, wherein the location of the camera viewport of the second panoramic image is in the second lane.

14. The system of claim 12, wherein the navigation controller comprises a click-and-go controller that retrieves a panoramic image closest to the intersection.

15. The system of claim 12, wherein the navigation controller comprises a walk around controller that retrieves a panoramic image closer to the intersection than a location of the image.

16. The system of claim 12, further comprising:

a processing pipeline server that creates a three-dimensional virtual model from a plurality of two-dimensional images.

17. The system of claim 12, wherein the processing pipeline server comprises:

a feature extractor that identifies a first plurality of features of a first panoramic image and a second plurality of features of a second panoramic image;

a feature matcher that determines a plurality of pairs of features, wherein each pair of features includes a first feature from the first plurality of features and a second feature from the second plurality of features, and wherein the first feature matches the second feature;

a point calculator that determines a plurality of points corresponding to the plurality of pairs of features; and a surface estimator that creates the three-dimensional virtual model based on the plurality of points.

18. The system of claim 17, wherein the feature extractor uses a Speeded Up Robust Features (SURF) algorithm.

19. The system of claim 17, wherein the feature matcher determines a spill tree for the first plurality of features, searches the spill tree for an approximate nearest neighbor and an approximate second nearest neighbor of each feature in the second image, and determines whether a feature similarity ratio of the approximate nearest neighbor and the approximate second-nearest neighbor is below a threshold.

20. The system of claim 17, wherein for each pair of features in the plurality of pairs of features, the point calculator determines a first ray extending from a first camera viewpoint of the first panoramic image through the first feature from the pair and a second ray extending from a second camera viewpoint of the second panoramic image through the second feature from the pair and determines a point from the plurality of points as an intersection between the first ray and the second ray.

* * * * *